US011934111B2

(12) United States Patent
Imanaka

(10) Patent No.: US 11,934,111 B2
(45) Date of Patent: Mar. 19, 2024

(54) DEVELOPING DEVICE AND IMAGE FORMING APPARATUS PROVIDED THEREWITH

(71) Applicant: KYOCERA Document Solutions Inc., Osaka (JP)

(72) Inventor: Koichi Imanaka, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 18/044,509

(22) PCT Filed: Aug. 10, 2021

(86) PCT No.: PCT/JP2021/029509
§ 371 (c)(1),
(2) Date: Mar. 8, 2023

(87) PCT Pub. No.: WO2022/054489
PCT Pub. Date: Mar. 17, 2022

(65) Prior Publication Data
US 2024/0027934 A1 Jan. 25, 2024

(30) Foreign Application Priority Data
Sep. 10, 2020 (JP) ................................ 2020-151829

(51) Int. Cl.
*G03G 15/08* (2006.01)

(52) U.S. Cl.
CPC ..... *G03G 15/0849* (2013.01); *G03G 15/0889* (2013.01)

(58) Field of Classification Search
CPC .......... G03G 15/0849; G03G 15/0856; G03G 15/0887; G03G 15/0889; G03G 2221/0005
See application file for complete search history.

(56) References Cited

U.S. PATENT DOCUMENTS

2009/0190960 A1* 7/2009 Hirayama .......... G03G 15/0853 399/256
2014/0161490 A1* 6/2014 Yamane ............. G03G 15/0887 399/257
2014/0270817 A1* 9/2014 Ikebata .............. G03G 15/0849 399/30

FOREIGN PATENT DOCUMENTS

EP 2778792 A2 * 9/2014 ......... G03G 15/0849
JP 2012-168232 A 9/2012
JP 2014-174495 A 9/2014

* cited by examiner

*Primary Examiner* — Sophia S Chen
(74) *Attorney, Agent, or Firm* — Stein IP, LLC

(57) ABSTRACT

A developing device (3*a*-3*d*) includes a development container (20); a stirring-conveying member (25); a toner detection sensor (51), and a scraper (52) that cleans a detection surface (51*a*) of the toner detection sensor (51). The scraper (52) includes a first member (52*a*) that contacts the detection surface (51*a*) of the toner detection sensor (51) during forward rotation of the stirring-conveying member (25), and a second member (52*b*) that contacts the detection surface (51*a*) of the toner detection sensor (51) during reverse rotation of the stirring-conveying member (25). The stirring-conveying member (25) includes a scraper holder (60) that holds the scraper (52) along inclination of a conveying blade (25*b*). The scraper holder (60) includes a first holding portion (61) that holds one side-end of the scraper (52) and a second holding portion (62) that holds another side-end of the scraper (52).

9 Claims, 7 Drawing Sheets

DEVELOPING DEVICE AND IMAGE FORMING APPARATUS PROVIDED THEREWITH

CROSS-REFERENCE TO RELATED APPLICATIONS

This application is a national stage of International Application No. PCT/JP2021/029509, filed Aug. 10, 2021, which claims the benefit of Japanese Application No. 2020-151829, filed Sep. 10, 2020, in the Japanese Patent Office, the disclosures of which are incorporated herein by reference.

TECHNICAL FIELD

The present invention relates to a developing device and an image forming apparatus provided therewith, and in particular relates to a developing device including a toner detection sensor that detects the concentration of toner or the amount of toner remaining in a development container and a scraper that cleans a detection surface of the toner detection sensor, and an image forming apparatus provided with such a developing device.

BACKGROUND ART

In image forming apparatuses, an electrostatic latent image formed on an image carrier including a photosensitive member and the like is developed by a developing device to be visualized as a toner image. Examples of the developing device include one employing a two-component developing method in which a two-component developer is used. In a developing device of this type, a two-component developer including a toner and a carrier is stored in a development container, and there are arranged a developing roller that supplies the developer to an image carrier and a stirring-conveying member that conveys, while stirring, the developer in the development container to supply the developer to the developing roller.

In this developing device, the toner is consumed in a developing operation. Thus, in order to replenish the toner by an amount consumed by the development, it is necessary to measure the toner concentration in the developer by a toner concentration detection sensor (toner detection sensor) provided in the development container.

Here, for accurate measurement of toner concentration, it is necessary to suppress accumulation of the developer on a detection surface of the toner concentration detection sensor. For this purpose, the stirring-conveying member is provided with a scraper for cleaning the detection surface of the toner concentration detection sensor. With this arrangement, during rotation of the stirring-conveying member, the scraper cleans the detection surface of the toner concentration detection sensor by sliding on the detection surface. Patent Document 1 identified below discloses a developing device that uses a nonwoven fabric as a scraper for cleaning a detection surface of a toner concentration detection sensor.

In a case where a nonwoven fabric is used as a scraper, the nonwoven fabric becomes worn as a result of sliding on a detection surface of a toner concentration detection sensor over a long period of time. This unfortunately makes it difficult to suppress accumulation of developer on the detection surface of the toner concentration detection sensor over a long period of time.

As a solution to this inconvenience, Patent Document 2 identified below discloses a developing device in which a scraper has a two-layered structure including a first member that contacts a detection surface of a toner detection sensor during forward rotation of a stirring-conveying member and a second member that contacts the detection surface of the toner detection sensor during reverse rotation of the stirring conveying member; here, the first member is more wear resistant than the second member, and a coefficient of friction between the second member and the detection surface is higher than a coefficient of friction between the first member and the detection surface.

CITATION LIST

Patent Literature

Patent Document 1: Japanese unexamined patent application publication No. 2012-168232

Patent Document 2: Japanese unexamined patent application publication No. 2014-174495

SUMMARY OF INVENTION

Technical Problem

In the scraper disclosed in Patent Document 2, an adhesive layer constituted by a double-sided adhesive tape or the like is used to bond together the layers of the two-layered structure. With this structure, a long-term rotation of the stirring-conveying member may cause mutual displacement of the layers, unfortunately degrading cleaning performance of the scraper.

In view of this inconvenience, an object of the present invention is to provide a developing device that is capable of suppressing accumulation of developer on a detection surface of a toner detection sensor over a long period of time and that is also capable of suppressing mutual displacement of layers of a scraper having a two-layered structure, and an image forming apparatus provided with such a developing device.

Solution to Problem

To achieve the above objects, according to a first configuration of the present invention, a developing device includes a development container, a stirring-conveying member, a toner detection sensor, and a scraper. The development container stores a developer that includes a toner. The stirring-conveying member is forwardly and reversely rotatable, includes a rotation shaft and a conveying blade integrally formed with the rotation shaft, and stirs and conveys the developer in the development container. The toner detection sensor detects a toner concentration or a toner remaining amount in the development container. The scraper is attached to the stirring-conveying member, and is caused to clean a detection surface of the toner detection sensor by rotation of the stirring-conveying member. The scraper includes a first member that contacts the detection surface of the toner detection sensor during forward rotation of the stirring-conveying member and a second member that contacts the detection surface of the toner detection sensor during reverse rotation of the stirring conveying member. The first member is more wear resistant than the second member, and a coefficient of friction between the second member and the detection surface is higher than a coefficient of friction between the first member and the detection surface. The stirring-conveying member includes a scraper holder that is formed so as to divide part of the conveying blade, and that holds the scraper along inclination of the conveying blade. The scraper holder includes a first holding portion that is arranged on one side of the conveying blade divided and that includes a pair of first holding pieces that hold one side-end portion of the scraper therebetween, and a second holding portion that is arranged on another side of the conveying blade divided and that includes a pair of second holding pieces that hold another side-end portion of the scraper therebetween.

Advantageous Effects of the Invention

According to the first configuration of the present invention, it is possible to suppress wear of the scraper due to sliding on the detection surface of the toner detection sensor during the forward rotation of the stirring-conveying member, and thus to suppress, over a long period of time, accumulation of the developer on the detection surface of the toner detection sensor. Furthermore, by reversely rotating the stirring-conveying member, it is possible to clean the detection surface of the toner detection sensor more effectively with the second member. Moreover, since the scraper is held by being inserted in the first holding portion and the second holding portion of the scraper holder, it is possible to suppress mutual displacement of the first and second members constituting the scraper more effectively than with the conventional configuration where a scraper is simply bonded to a stirring-conveying screw. Accordingly, it is possible to maintain the cleaning performance of the scraper over a long period of time.

DESCRIPTION OF EMBODIMENTS

Figure 1:
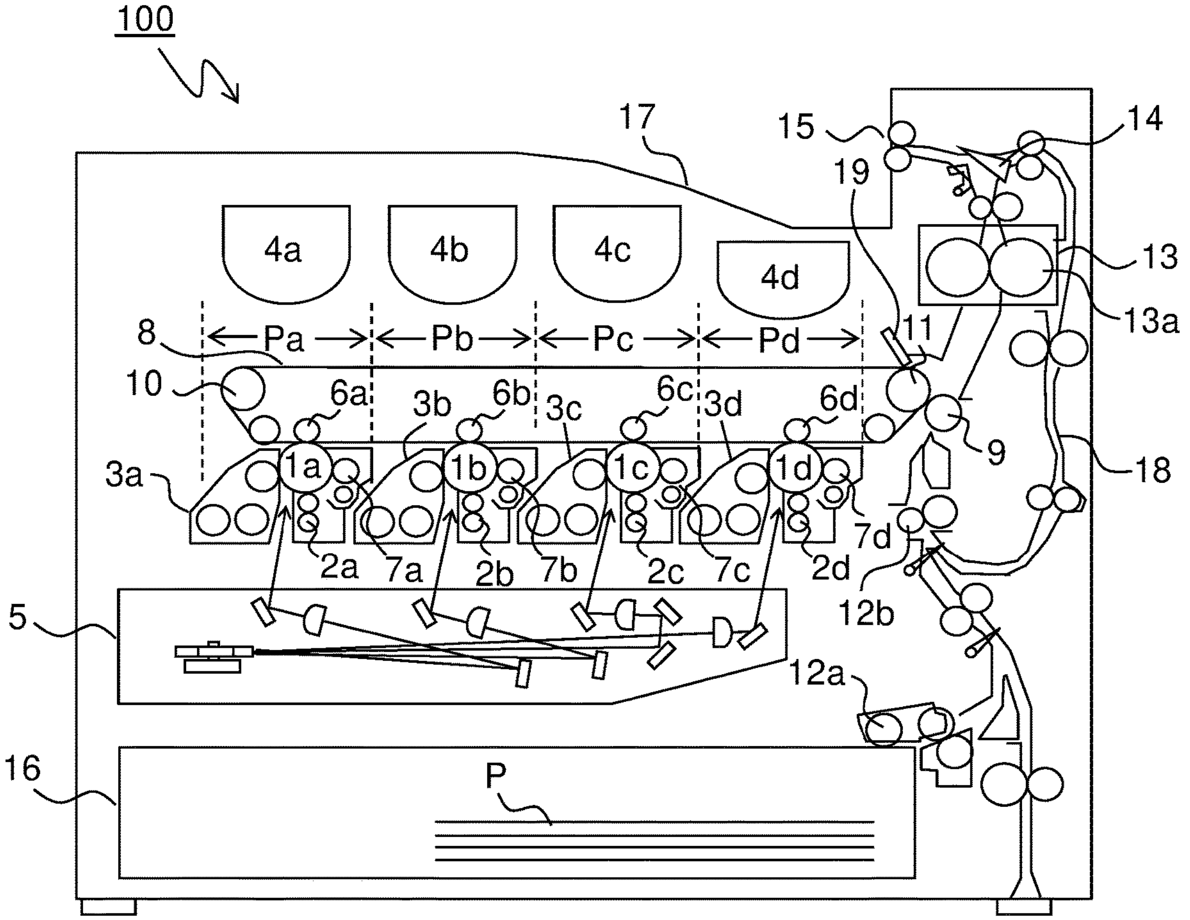
FIG. 1 is a schematic sectional view showing an internal structure of an image forming apparatus 100 in which developing devices 3*a* to 3*d* of the present invention are incorporated.

Hereinafter, a description will be given of an embodiment of the present invention with reference to the accompanying drawings. FIG. 1 is a schematic sectional view showing an internal structure of an image forming apparatus 100 in which developing devices 3*a* to 3*d* of the present invention are incorporated. In the image forming apparatus 100 (here, a color printer), four image forming portions Pa, Pb, Pc, and Pd are arranged in this order from an upstream side in a conveyance direction (a left side in FIG. 1). These image forming portions Pa to Pd are provided corresponding to images of four different colors (cyan, magenta, yellow, and black). The image forming portions Pa to Pd form a cyan, a magenta, a yellow, and a black image sequentially through processes of charging, exposure, developing, and transfer.

In the image forming portions Pa to Pd, there are arranged photosensitive drums (image carriers) 1*a*, 1*b*, 1*c*, and 1*d* that carry visible images (toner images) of the different colors. Further, next to the image forming portions Pa to Pd, there is provided an intermediate transfer belt 8 that is driven by driving means (not shown) to rotate counter-clockwise in FIG. 1. The toner images formed on the photosensitive drums 1*a* to 1*d* are primarily transferred sequentially to the intermediate transfer belt 8, which moves while in contact with the photosensitive drums 1*a* to 1*d*, to be superposed one on another. Thereafter, the toner images having been primarily transferred to the intermediate transfer belt 8 are secondarily transferred by a secondary transfer roller 9 to a transfer sheet P as one example of a recording medium. The transfer sheet P having the toner images secondarily transferred thereto then has the toner images fixed thereto at a fixing portion 13, and is then discharged out of a body of the image forming apparatus 100. While the photosensitive drums 1*a* to 1*d* are being rotated clockwise in FIG. 1, an image forming process is performed with respect to the photosensitive drums 1*a* to 1*d*.

Transfer sheets P to which toner images are to be transferred are stored in a sheet cassette 16 arranged in a lower portion of the body of the image forming apparatus 100. A transfer sheet P is conveyed via a sheet feeding roller 12*a* and a pair of registration rollers 12*b* to a nip portion between the secondary transfer roller 9 and a driving roller 11 for driving the intermediate transfer belt 8. Used as the intermediate transfer belt 8 is a sheet of a dielectric resin, typically a belt with no seam (a seamless belt). On a downstream side of the secondary transfer roller 9, there is arranged a blade-shaped belt cleaner 19 for removing toner and the like left on the surface of the intermediate transfer belt 8.

Next, the image forming portions Pa to Pd will be described. Around and under the photosensitive drums 1*a* to 1*d* arranged rotatably, there are provided charging devices 2*a*, 2*b*, 2*c*, and 2*d* that charge the photosensitive drums 1*a* to 1*d*, an exposure device 5 that exposes the photosensitive drums 1*a* to 1*d* to light conveying image information, developing device 3*a*, 3*b*, 3*c*, and 3*d* that form toner images on the photosensitive drums 1*a* to 1*d*, and cleaning devices 7*a*, 7*b*, 7*c*, and 7*d* that remove developer (toner) and the like left on the photosensitive drums 1*a* to 1*d*.

When image data is received from a host device such as a personal computer, first, the charging devices 2*a* to 2*d* uniformly charge the surfaces of the photosensitive drums 1*a* to 1*d*. Then, the exposure device 5 irradiates the photosensitive drums 1*a* to 1*d* with light according to the image data, so that electrostatic latent images are formed on the photosensitive drums 1*a* to 1*d* corresponding to the image data. The developing devices 3*a* to 3*d* are each loaded with a predetermined amount of two-component developer including cyan, magenta, yellow, or black toner. When, as a result of toner-image formation described later, the proportion of toner in the two-component developer in the developing devices 3*a* to 3*d* has fallen below a prescribed value, toner is replenished from toner containers 4*a* to 4*d* to the developing devices 3*a* to 3*d*. The toner included in the developer is supplied by the developing devices 3*a* to 3*d* onto the photosensitive drums 1*a* to 1*d*, and electrostatically adheres to the photosensitive drums 1*a* to 1*d*. In this way, toner images corresponding to the electrostatic latent images, formed by exposure to light from the exposure device 5, are formed on the photosensitive drums 1*a* to 1*d*.

Primary transfer rollers 6*a* to 6*d* produce an electric field with a predetermined transfer voltage between the primary transfer rollers 6*a* to 6*d* and the photosensitive drums 1*a* to 1*d*. As a result, the cyan, magenta, yellow, and black toner images on the photosensitive drums 1*a* to 1*d* are primarily transferred to the intermediate transfer belt 8. These images of the four colors are formed in a predetermined positional relationship with each other determined in advance for formation of a predetermined full-color image. Thereafter, in preparation for a subsequent formation of new electrostatic latent images, the toner and the like that are left on the surfaces of the photosensitive drums 1*a* to 1*d* after the primary transfer are removed by the cleaning devices 7*a* to 7*d*.

The intermediate transfer belt 8 is stretched around a driven roller 10, which is located on an upstream side, and a driving roller 11, which is located on a downstream side. When, along with rotation of the driving roller 11 driven by a driving motor (not shown), the intermediate transfer belt 8 starts to rotate counter-clockwise, a transfer sheet P is conveyed, with predetermined timing, from the pair of registration rollers 12*b* to the nip (a secondary transfer nip) between the driving roller 11 and the secondary transfer roller 9 provided next to the driving roller 11. Then, the full-color image on the intermediate transfer belt 8 is secondarily transferred onto the transfer sheet P passing through the secondary transfer nip. The transfer sheet P having the toner image secondarily transferred thereon is conveyed to the fixing portion 13.

The transfer sheet P conveyed to the fixing portion 13 is heated and pressed by a pair of fixing rollers 13*a* so that the toner image is fixed to the surface of the transfer sheet P, and thereby the predetermined full-color image is formed. The transfer sheet P having the full-color image formed thereon has its conveying direction switched by a branch portion 14 branching into a plurality of directions, so that the transfer sheet P is discharged as it is (or after being sent into a duplex-printing conveying path 18 and subjected to duplex printing) onto a discharge tray 17 by a pair of discharge rollers 15.

Figure 2:
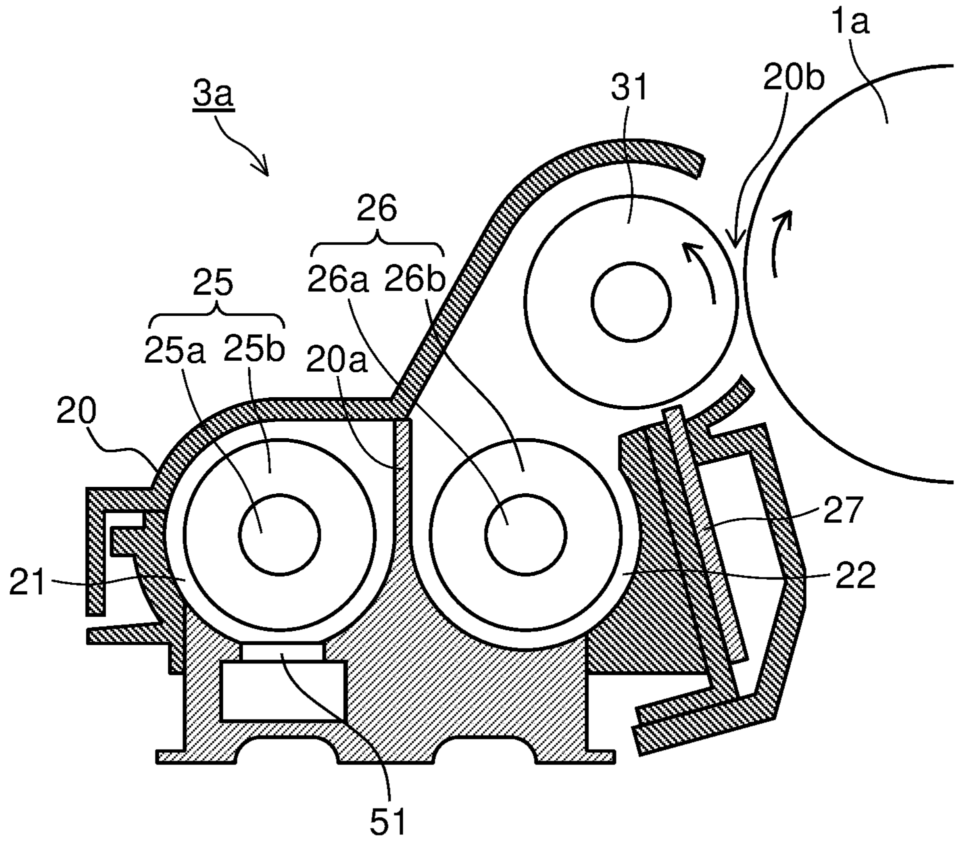
FIG. 2 is a side sectional view showing a structure of a developing device 3*a* according to an embodiment of the present invention.
Figure 3:
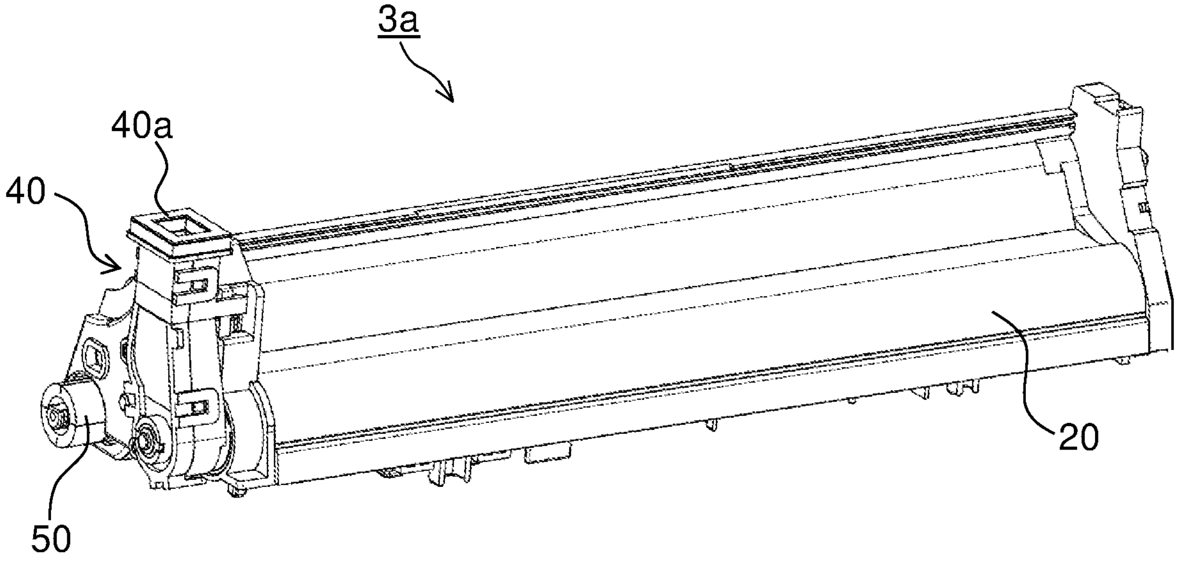
FIG. 3 is an exterior perspective view of the developing device 3*a* of the present embodiment as seen from a side opposite to a photosensitive drum 1*a*.
Figure 4:
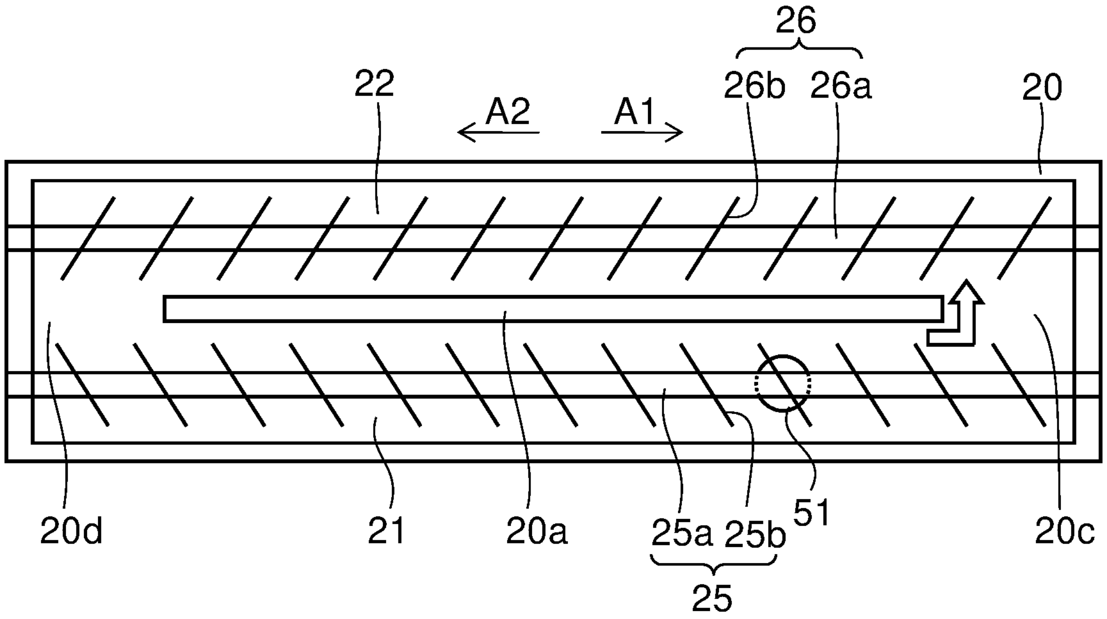
FIG. 4 is a plan sectional view schematically showing a structure of a stirring portion of the developing device 3*a* of the present embodiment.

FIG. 2 is a side sectional view of the developing device 3*a* incorporated in the image forming apparatus 100. FIG. 3 is an exterior perspective view of the developing device 3*a* as seen from a side opposite to the photosensitive drum 1*a* (a left side in FIG. 2). FIG. 4 is a plan sectional view schematically showing a structure of a stirring portion of the developing device 3*a*. While the following description will deal with, as an example, the developing device 3*a* arranged in the image forming portion Pa in FIG. 1, the developing devices 3*b* to 3*d* arranged in the image forming portions Pb to Pd have basically the same structure, and therefore no overlapping description will be repeated.

As shown in FIG. 2, the developing device 3*a* is provided with a development container 20 in which two-component developer (hereinafter also referred to simply as developer) that includes magnetic carrier and toner is stored. The development container 20 is divided into a stirring-conveying chamber 21 and a supplying-conveying chamber 22 by a partition wall 20*a*. In the stirring-conveying chamber 21 and the supplying-conveying chamber 22, there are rotatably arranged a stirring-conveying screw 25 and a supplying-conveying screw 26, respectively, for mixing and stirring the toner fed from the toner container 4*a* (see FIG. 1) with the magnetic carrier, to thereby charge the toner.

The stirring-conveying screw 25, which is arranged in the stirring-conveying chamber 21, includes a rotation shaft 25*a* and a first helical blade 25*b* provided integrally with the rotation shaft 25*a* in a helical shape formed on the rotation shaft 25*a* with a constant pitch in an axial direction of the rotation shaft 25*a*. The rotation shaft 25*a* is rotatably supported in the development container 20. The stirring-conveying screw 25 rotates to thereby convey the developer in the stirring-conveying chamber 21, while stirring the developer, in a predetermined direction (toward one side in an axial direction of a developing roller 31).

The supplying-conveying screw 26, which is arranged in the supplying-conveying chamber 22, includes a rotation shaft 26*a* and a second helical blade 26*b* provided integrally with the rotation shaft 26*a* in a helical shape with the blade facing (reversely wound around the rotation shaft 26*a*) in a direction opposite to the direction of the first helical blade 25*b*. The rotation shaft 26*a* is arranged parallel to the rotation shaft 25*a* of the stirring-conveying screw 25, and is rotatably supported in the development container 20. The supplying-conveying screw 26 rotates to thereby convey the developer in the supplying-conveying chamber 22, while stirring the developer, in a direction opposite to the direction of the stirring-conveying screw 25, and supplies the developer to the developing roller 31.

The developer is conveyed, while being stirred, by the stirring-conveying screw 25 and the supplying-conveying screw 26 in the axial directions (the directions perpendicular to the plane of the sheet on which FIG. 2 is drawn), to circulate between the stirring-conveying chamber 21 and the supplying-conveying chamber 26 via communication portions 20*c* and 20*d* (see FIG. 4) formed at opposite end portions of the partition wall 20*a*. That is, the stirring-conveying chamber 21, the supplying-conveying chamber 22, and the communication portions 20*c* and 20*d* form a developer circulation path in the development container 20.

The development container 20 extends diagonally up rightward in FIG. 2, and in the development container 20, the developing roller 31 is arranged diagonally to the upper right of the supplying-conveying screw 26. The developing roller 31 has part of an outer circumferential surface thereof exposed through an opening portion 20*b* of the development container 20 to face the photosensitive drum 1*a*. The developing roller 31 rotates counter-clockwise in FIG. 2. To the developing roller 31, a developing voltage is applied which is composed by superposing an alternating-current voltage on a direct-current voltage.

The developing roller 31 includes a developing sleeve having a cylindrical shape rotatable counter-clockwise in FIG. 2, and a magnet (not shown) fixed in the developing sleeve and having a plurality of magnetic poles. The developing sleeve used here has its surface knurled, but it is also possible to use, instead, a developing sleeve having a large number of depressions (dimples) formed in its surface, or one having a blasted surface.

In the development container 20, a regulation blade 27 is attached along a longitudinal direction of the developing roller 30 (a direction perpendicular to the plane of sheet on which FIG. 2 is drawn). Between a leading-edge portion of the regulation blade 27 and the surface of the developing roller 31, a small space (gap) is formed.

As shown in FIG. 3, at one end (a left end in FIG. 3) of the developing device 3*a*, a toner replenishment portion 40 is provided which replenishes toner from the toner container 4*a* (see FIG. 1) into the development container 20. In an upper end portion of the toner replenishment portion 40, a toner replenishment port 40*a* is formed via which the toner is received from the toner container 4*a*. On a side face of the development container 20 on a side of the toner replenishment portion 40, a drive input gear 50 is arranged. The toner replenished via the toner replenishment port 40*a* is fed into the stirring-conveying chamber 21 from an upstream side (a left side in FIG. 4) of the stirring-conveying chamber 21.

As shown in FIG. 4, inside the development container 20, the partition wall 20*a*, the stirring-conveying chamber 21, the supplying-conveying chamber 22, the upstream-side communication portion 20*c*, and the downstream-side communication portion 20*d* are formed. In the stirring-conveying chamber 21, the left side in FIG. 4 is the upstream side, and the right side in FIG. 4 is the downstream side. In the supplying-conveying chamber 22, the right side in FIG. 4 is the upstream side and the left side in FIG. 4 is the downstream side. Accordingly, the communication portions are denoted with the terms "upstream-side" and "downstream-side" with reference to the supplying-conveying chamber 22.

The partition wall 20*a* extends in a longitudinal direction of the development container 20 to partition the development container 20 into the stirring-conveying chamber 21 and the supplying-conveying chamber 22 such that the two chambers are arranged parallel to each other. The upstream-side communication portion 20*c* and the downstream-side communication portion 20*d* are provided at one end and at another end (direction-A1 side and direction-A2 side), respectively, of the partition wall 20*a* in a longitudinal direction thereof. The upstream-side communication portion 20*c* connects direction-A1 end portions of the stirring-conveying chamber 21 and the supplying-conveying chamber 22 to each other. The downstream-side communication portion 20*d* connects direction-A2 end portions of the stirring-conveying chamber 21 and the supplying-conveying chamber 22 to each other.

The rotation shaft 25*a* of the stirring-conveying screw 25 is rotatably supported in the development container 20. The stirring-conveying screw 25, by means of the first helical blade 25*b*, conveys the developer in the stirring-conveying chamber 21 in direction A1 while stirring the developer.

Note that the stirring-conveying screw 25 is driven to rotate by an unillustrated motor, and is rotatable in forward and reverse directions. During forward rotation, the stirring-conveying screw 25 rotates in a direction for a printing operation (when image formation is performed). During reverse rotation, the stirring-conveying screw 25 rotates in a direction for a cleaning operation by means of a later-described nonwoven fabric 52*b* (when image formation is not performed).

The rotation shaft 26*a* of the supplying-conveying screw 26 is arranged parallel to the rotation shaft 25*a*, and is rotatably supported in the development container 20. The supplying-conveying screw 26, by means of the second helical blade 26*b*, conveys the developer in the supplying-conveying chamber 22 in direction A2 (which is opposite to direction A1), while stirring the developer, to supply the developer to the developing roller 31.

The stirring-conveying screw 25 is formed of resin such as PS (polystyrene), ABS (acrylonitrile butadiene styrene copolymer), or PC (polycarbonate), and the first helical blade 25*b* and the rotation shaft 25*a* are integrally molded. Likewise, the supplying-conveying screw 26 is also formed of resin such as PS, ABS, or PC, and the second helical blade 26*b* and the rotation shaft 26*a* are integrally molded. Note that the rotation shafts 25*a* and 26*a* are each formed of resin only, without using a metal shaft core.

As shown in FIGS. 2 and 4, at a bottom of the stirring-conveying chamber 21, a toner concentration detection sensor (a toner detection sensor) 51 is arranged. The toner concentration detection sensor 51 is arranged on an upstream side of the upstream-side communication portion 20*d* with respect to a developer conveyance direction (direction A1 in FIG. 4) in the stirring-conveying chamber 21.

Used as the toner concentration detection sensor 51 is a magnetic permeability sensor that detects magnetic permeability of the developer in the development container 20. When a magnetic permeability is detected by the toner concentration detection sensor 51, a voltage value corresponding to the detection result is output to a control portion (not shown). Then the control portion determines the toner concentration based on the output value of the toner concentration detection sensor 51.

The sensor output value varies according to the toner concentration such that the higher the toner concentration, the higher the ratio of the toner to the magnetic carrier is and thus the higher the proportion of the toner impermeable to magnetism, which results in a reduction of the output value. On the other hand, the lower the toner concentration, the lower the ratio of the toner to the carrier and thus the higher the proportion of the carrier permeable to magnetism, which results in an increase of the output value.

Figure 5:
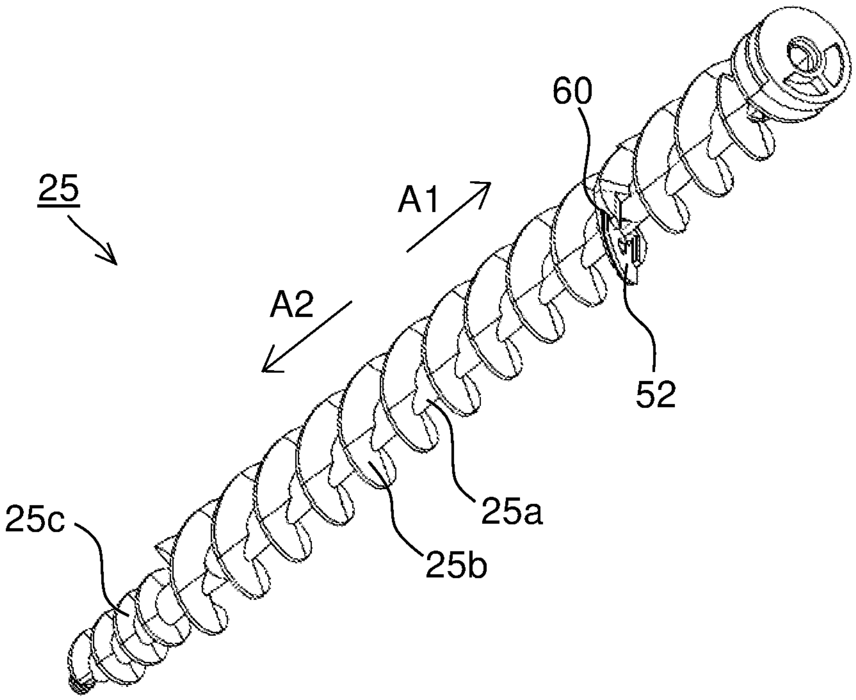
FIG. 5 is a perspective view of a stirring-conveying screw 25 used in the developing device 3*a*, as seen from a downstream side in a developer conveyance direction.
Figure 6:
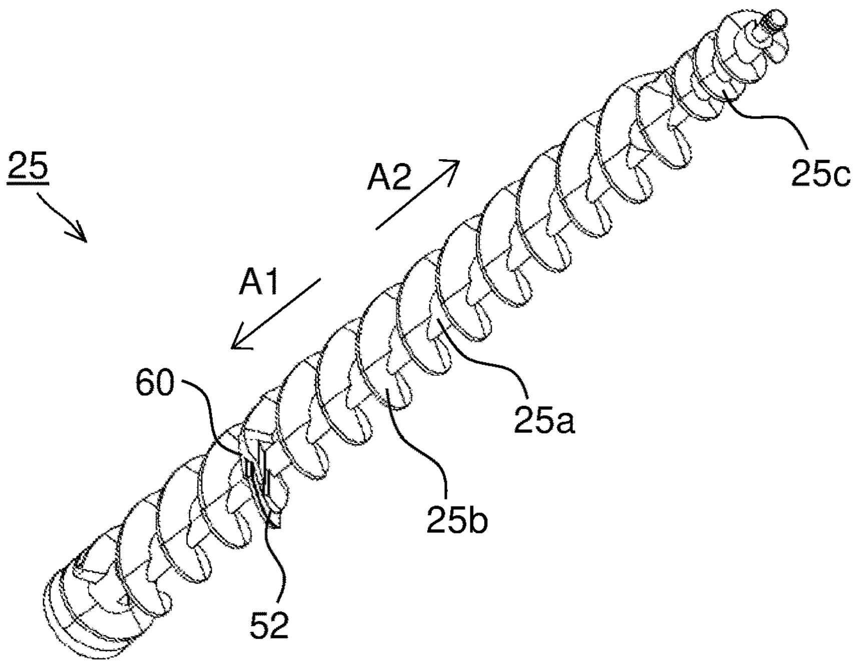
FIG. 6 is a perspective view of the stirring-conveying screw 25 used in the developing device 3*a*, as seen from an upstream side in the developer conveyance direction.

FIGS. 5 and 6 are perspective views showing a structure of the stirring-conveying screw 25 as seen from a downstream side and an upstream side, respectively, in the developer conveyance direction (direction A1) in the stirring-conveying chamber 22. As shown in FIGS. 5 and 6, the stirring-conveying screw 25 has the scraper 52 fixed thereto at a portion thereof opposite the toner concentration detection sensor 51. The scraper 52 is attached to the scraper holder 60 formed in the first helical blade 25*b* of the stirring-conveying screw 25.

The rotation shaft 25*a* of the stirring-conveying screw 25 extends into the toner replenishment portion 40. The rotation shaft 25*a* of the stirring-conveying screw 25 has integrally formed therewith a replenishment blade 25*c* on such a portion of the rotation shaft 25*a* that is located in the toner replenishment portion 40. The replenishment blade 25*c* is formed of a helical blade facing the same direction (wound in the same direction) as the first helical blade 25*b* and having a smaller diameter than the first helical blade 25*b*, with a smaller pitch than the first helical blade 25*b*.

The toner replenished from the toner container 4*a* (see FIG. 1) via the toner replenishment port 40*a* to the toner replenishment portion 40 is then caused by the replenishment blade 25*c* of the stirring-conveying screw 25 to move along the rotation shaft 25*a* to enter the stirring-conveying chamber 21. Then, the toner is stirred and mixed with the developer in the stirring-conveying chamber 21 (the developer received from the supplying-conveying chamber 22), and thereby the toner is charged to a predetermined charge amount. That is, the stirring-conveying screw 25 functions also as a conveying member for conveying the toner inside the toner replenishment portion 40 toward the stirring-conveying chamber 21.

Figure 7:
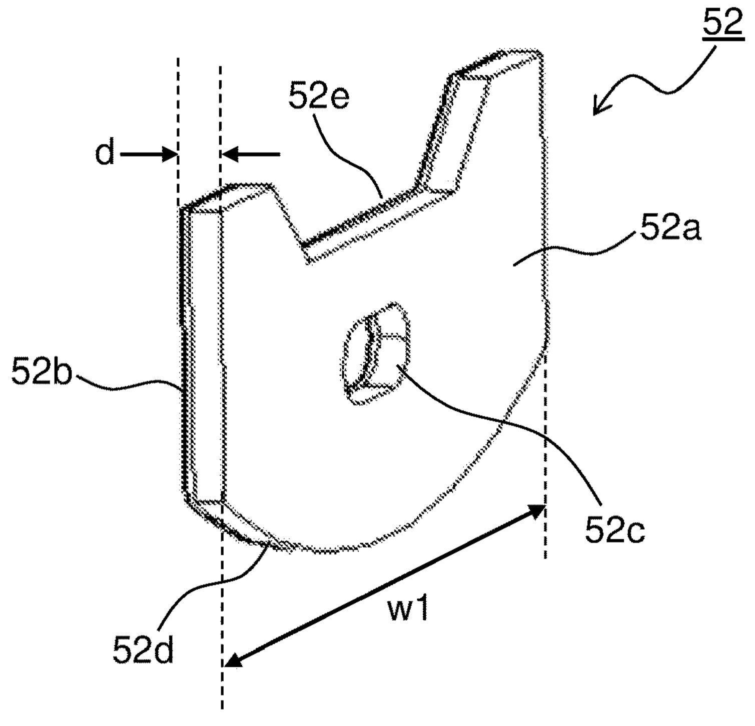
FIG. 7 is an enlarged perspective view showing a structure of a scraper 52 to be attached to the stirring-conveying screw 25.

FIG. 7 is an enlarged perspective view showing a structure of the scraper 52 to be attached to the stirring-conveying screw 25, showing the scraper 52 as seen from a side of a polyethylene sheet 52*a*. As shown in FIG. 7, the scraper 52 is formed by bonding the polyethylene sheet (a first member) 52*a* and the nonwoven fabric (a second member) 52*b* to each other with an unillustrated adhesive layer constituted by a double-sided adhesive tape or the like.

The polyethylene sheet 52*a* is about 0.1 mm to 0.2 mm thick, and the nonwoven fabric 52*b* is about 1 mm thick. A coefficient of friction between the nonwoven fabric 52*b* and a detection surface 51*a* (see FIG. 12) of the toner concentration detection sensor 51 is higher than a coefficient of friction between the polyethylene sheet 52*a* and the detection surface 51*a* of the toner concentration detection sensor 51. The polyethylene sheet 52*a* is formed of what is called an ultra-high molecular weight polyethylene having a molecular weight of about one million to about seven million, and is more wear resistant than the nonwoven fabric 52*b*.

At a center portion of the scraper 52, a positioning hole 52*c* is formed as an oval hole that penetrates through the polyethylene sheet 52*a* and the nonwoven fabric 52*b*. An end portion 52*d* (a lower end portion in FIG. 7) of the scraper 52 on a side at which the scraper 52 is to contact the detection surface 51*a* is curved in an arc shape. An end portion (an upper end portion in FIG. 7) of the scraper 52 on a side at which the scraper 52 is to be fixed to the rotation shaft 25*a* has a trapezoidal cut 52*e* formed therein. The cut 52*e* helps avoid interference between the scraper 52 and the rotation shaft 25*a* when fitting the scraper 52 to the scraper holder 60.

Figure 8:
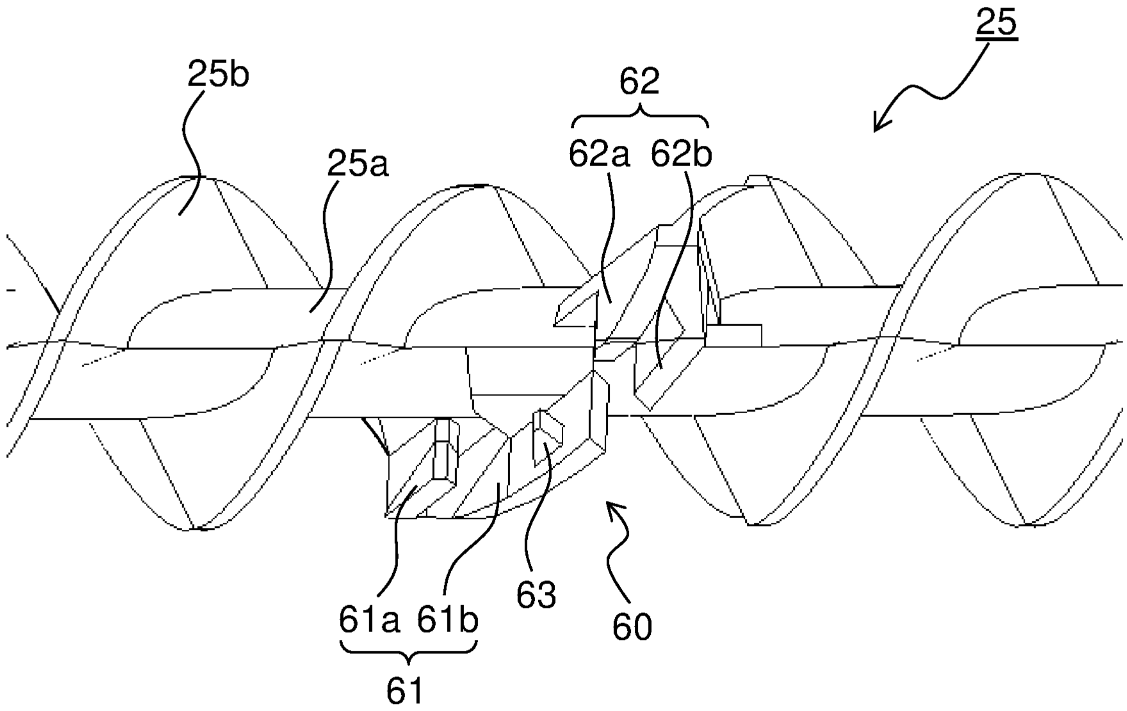
FIG. 8 is an enlarged perspective view of a scraper holder 60 formed at the stirring-conveying screw 25, as seen from a downstream side in the developer conveyance direction.
Figure 9:
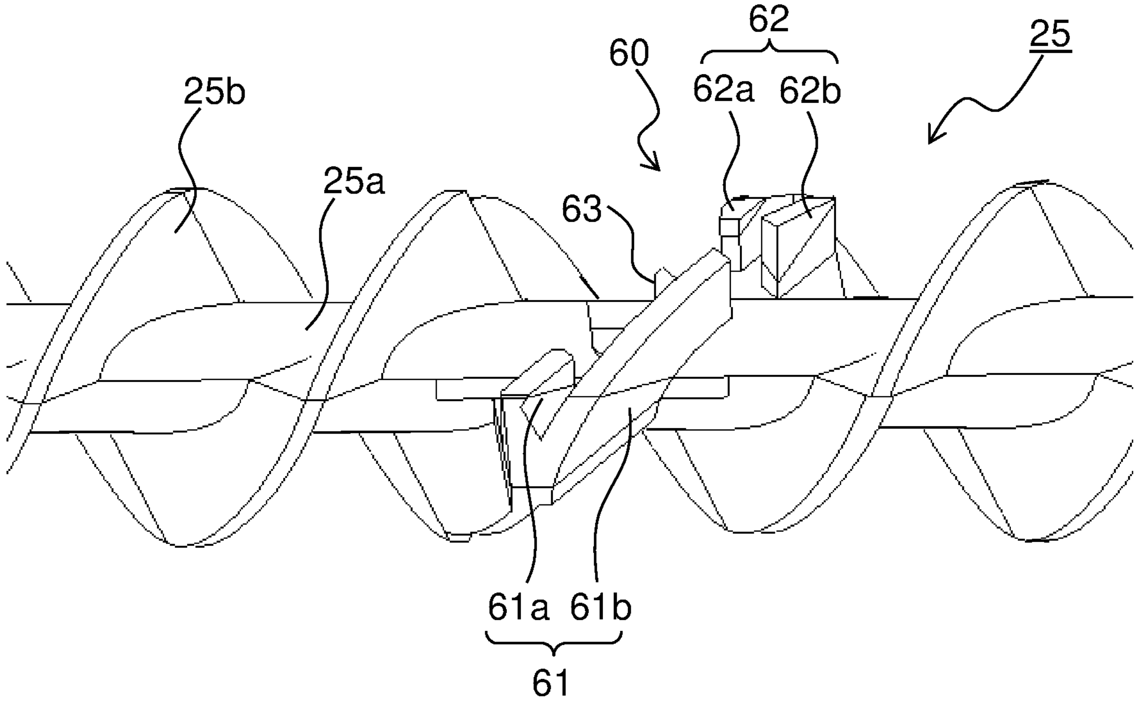
FIG. 9 is an enlarged perspective view of the scraper holder 60 formed at the stirring-conveying screw 25, as seen from an upstream side in the developer conveyance direction.

FIGS. 8 and 9 are enlarged perspective views of the scraper holder 60, which is formed at the first helical blade 25*b* of the stirring-conveying screw 25, and show the scraper holder 60 as seen from a downstream side and an upstream side, respectively, in the developer conveyance direction. The scraper holder 60 is formed so as to divide part of the first helical blade 25*b*, and includes a first holding portion 61, a second holding portion 62, and a positioning protrusion 63.

The first holding portion 61 and the second holding portion 62 are arranged opposite each other, on one side and another side, respectively, of the divided first helical blade 25*b*. The first holding portion 61 includes a pair of first holding pieces 61*a* and 61*b* that hold one side-end portion of the scraper 52 therebetween. The second holding portion 62 includes a pair of second holding pieces 62*a* and 62*b* that hold another side-end portion of the scraper 52 therebetween.

The first holding portion 61 and the second holding portion 62 are spaced from each other by a distance that is substantially equal to a width-direction dimension w1 (see FIG. 7) of the scraper 52. Between the first holding pieces 61*a* and 61*b*, and between the second holding pieces 62*a* and 62*b*, there is a gap that is smaller than a thickness d (see FIG. 7) of the scraper 52.

The first holding piece 61*a* and the second holding piece 62*a* are arranged on a downstream side with respect to a phase advance direction (the developer conveyance direction) of the first helical blade 25*b* in the forward rotation of the stirring-conveying screw 25. The first holding piece 61*a* and the second holding piece 62*a* contact the polyethylene sheet 52*a* of the scraper 52. The first holding piece 61*b* and the second holding piece 62*b* are arranged on an upstream side with respect to the phase advance direction of the first helical blade 25*b* in the forward rotation of the stirring-conveying screw 25. The first holding piece 61*b* and the second holding piece 62*b* contact the nonwoven fabric 52*b* of the scraper 52.

The first holding piece 61*b* is formed longer than the first holding piece 61*a* in a circumferential direction (a direction in which the first helical blade 25*b* continues), and extends close to the second holding piece 62*b*. On the first holding piece 61*b*, the positioning protrusion 63 is formed, which is to be inserted in the positioning hole 52*c* of the scraper 52.

To fit the scraper 52 to the scraper holder 60, first, an edge of the scraper 52 on one side (a left side in FIG. 7) is inserted into the gap between the first holding pieces 61*a* and 61*b* of the first holding portion 61 such that the cut 52*e* of the scraper 52 straddles the rotation shaft 25*a*.

Then, the positioning protrusion 63 formed on the first holding piece 61*b* is inserted into the positioning hole 52*c* from the nonwoven fabric 52*b* side of the scraper 5. The positioning hole 52*c* is formed in an oval shape of which an inner diameter in the circumferential direction of the stirring-conveying screw 25 (a left-right direction in FIG. 7) is larger than an outer diameter of the positioning protrusion 63, and of which an inner diameter in a radial direction of the stirring-conveying screw 25 (an up-down direction in FIG. 7) is equal to the outer diameter of the positioning protrusion 63. Thus, regardless of dimensional tolerance of the scraper 52 or the scraper holder 60, smooth insertion of the positioning protrusion 63 is ensured. Thereafter, an edge of the scraper 52 on another side (a right side in FIG. 7) is inserted into the gap between the second holding pieces 62*a* and 62*b* of the second holding portion 62. In the manner hitherto described, fitting of the scraper 52 is completed.

No bonding is necessary between the scraper holder 60 and the scraper 52. Here, a bonding agent may also be applied between each of the first holding portion 61 and the second holding portion 62 and the scraper 52 as necessary to further enhance the holding strength for holding the scraper 52 in the scraper holder 60.

However, if a bonding agent is applied to both the first holding pieces 61*a* and 61*b* and to both the second holding pieces 62*a* and 62*b*, workability is degraded in fitting the scraper 52 to the scraper holder 60. For this reason, it is preferable to apply a bonding agent only to the first holding piece 61*a* and the second holding piece 62*a* of the scraper 52, which contact the polyethylene sheet 52*a*, or, only to the first holding piece 61*b* and the second holding piece 62*b*, which contact the nonwoven fabric 52*b*. As compared with the first holding piece 61*a*, the first holding piece 61*b* is formed longer and thus contacts the scraper 52 over a larger area. Thus, it is more preferable to apply the bonding agent only to the first holding piece 61*b* and the second holding piece 62*b*.

Figure 10:
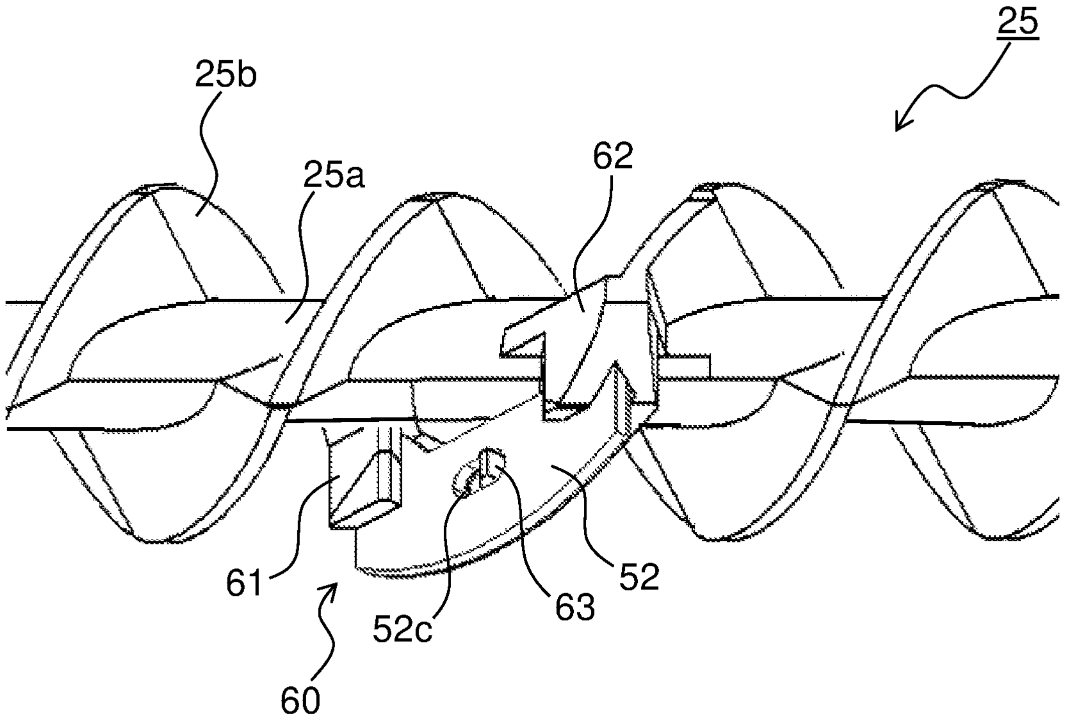
FIG. 10 is an enlarged perspective view of the scraper holder 60 with the scraper 52 attached thereto, as seen from the downstream side in the developer conveyance direction.
Figure 11:
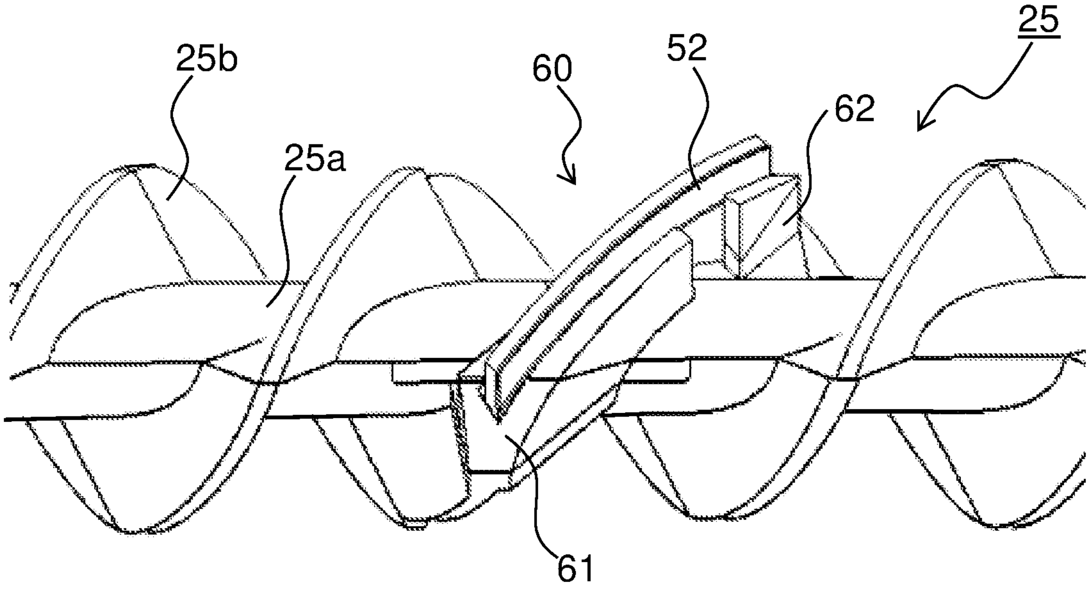
FIG. 11 is an enlarged perspective view of the scraper holder 60 with the scraper 52 attached thereto, as seen from the upstream side in the developer conveyance direction.

FIGS. 10 and 11 are enlarged perspective views of the scraper holder 60 with the scraper 52 attached thereto, and shows the scraper holder 60 as seen from a downstream side and an upstream side, respectively, in the developer conveyance direction. The scraper 52 is attached along inclination of the first helical blade 25*b*. That is, with the scraper 52 attached to the scraper holder 60 of the stirring-conveying screw 25, the end portion 52*d* constitutes part of a continuous outer edge portion of the first helical blade 25*b*.

By the positioning protrusion 63 being inserted in the positioning hole 52*c*, movement of the scraper 52 in the radial direction is restricted. Accordingly, it is possible to maintain a constant amount of protrusion of the scraper 52 from the outer edge portion of the first helical blade 25*b*, and thus to stably clean the sensor surface 51*a* (see FIG. 12). Movement of the scraper 52 in the circumferential direction is restricted by the first holding portion 61 and the second holding portion 62.

Figure 12:
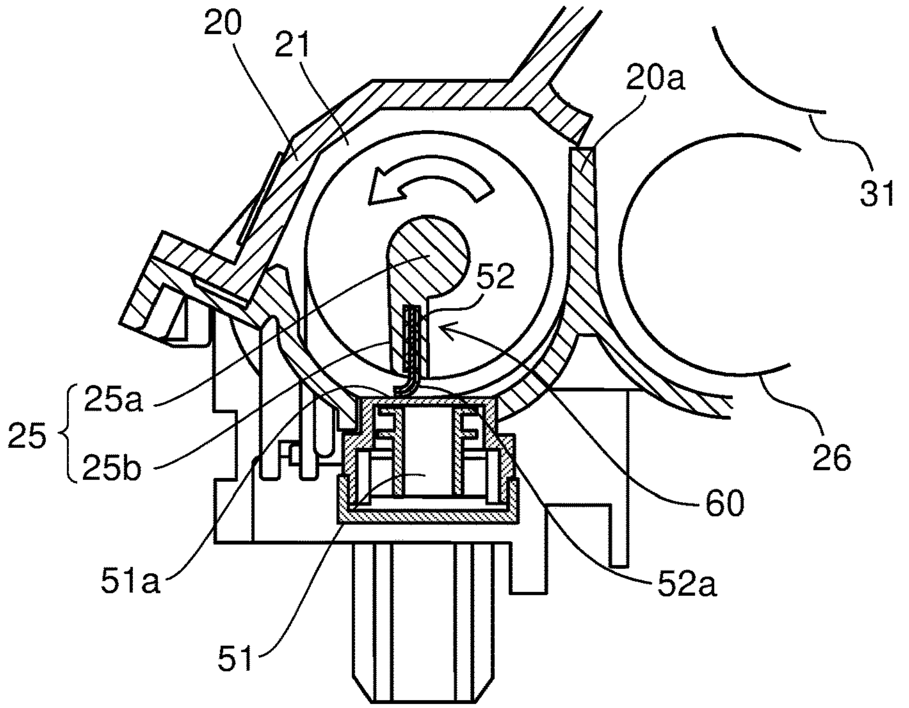
FIG. 12 is a side sectional view showing a structure around a toner concentration detection sensor 51 of the developing device 3*a*, with the stirring-conveying screw 25 rotating forwardly.
Figure 13:
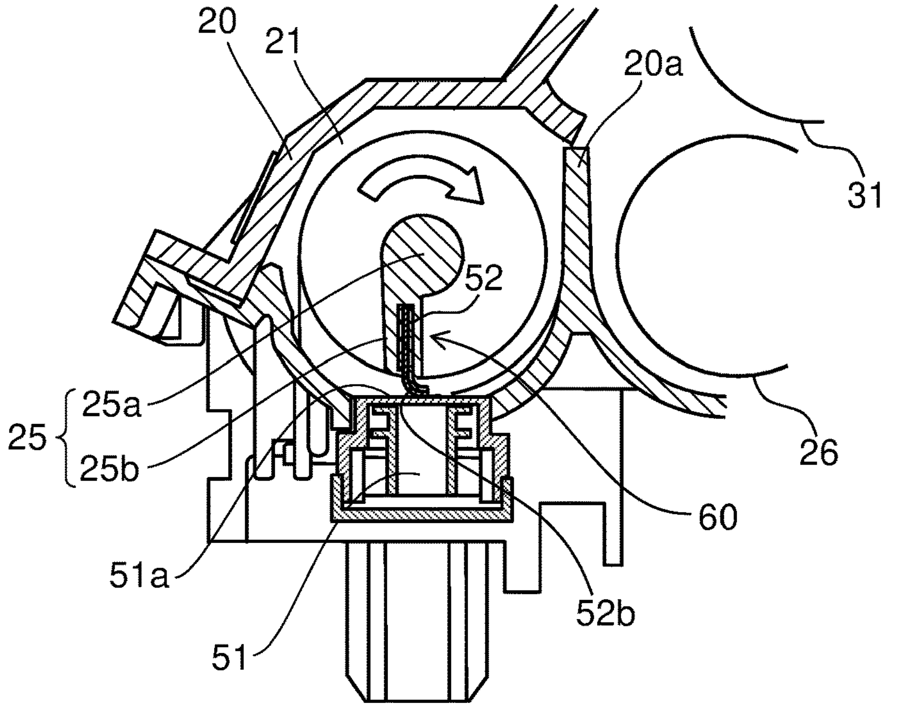
FIG. 13 is a side sectional view showing the structure around the toner concentration detection sensor 51 of the developing device 3*a*, with the stirring-conveying screw 25 rotating reversely.

FIGS. 12 and 13 are side sectional views showing a structure around the toner concentration detection sensor 51 of the developing device 3*a*, with the stirring-conveying screw 25 rotating forwardly and reversely, respectively.

As shown in FIG. 12, the scraper 52 is fitted to the first helical blade 25*b* so as to protrude from the outer edge portion (the lower end portion in FIG. 12) of the first helical blade 25*b* by a protrusion height that is greater than a distance between a leading edge of the first helical blade 25*b* and the detection surface 51*a* of the toner concentration detection sensor 51. As a result, the scraper 52, in a bent state, contacts the detection surface 51*a* of the toner concentration detection sensor 51.

Note that, in a case where the rotation shaft 25*a* is formed only of resin as in the present embodiment, in order to ensure secure sliding on (secure contact with) the detection surface 51*a* of the toner concentration detection sensor 51 even when the rotation shaft 25*a* is warped, the protrusion height of the scraper 52 is set even greater.

During normal image formation, the stirring-conveying screw 25 rotates forward. At this time, as shown in FIG. 12, a surface of the polyethylene sheet 52*a* (one side of the scraper 52) slides on the detection surface 51*a* of the toner concentration detection sensor 51. On the other hand, when the stirring-conveying screw 25 is reversely rotated, as shown in FIG. 13, a surface of the nonwoven fabric 52*b* (another side of the scraper 52) slides on the detection surface 51*a* of the toner concentration detection sensor 51. In this manner, the polyethylene sheet 52*a* or the nonwoven fabric 52*b* slides on the detection surface 51*a* of the toner concentration detection sensor 51, and thereby the detection surface 51*a* is cleaned.

As for timing to reversely rotate the stirring-conveying screw 25, the stirring-conveying screw 25 may be reversely rotated each time a printing operation is completed, or each time printing has been performed on a predetermined number of transfer sheets. When the stirring-conveying screw 25 is reversely rotated, the supplying-conveying screw 26 may also be reversely rotated.

According to the configuration of the present embodiment, the scraper 52 includes the polyethylene sheet 52*a* which contacts the detection surface 51*a* of the toner concentration detection sensor 51 during the forward rotation of the stirring-conveying screw 25 and the nonwoven fabric 52*b* which contacts the detection surface 51*a* of the toner concentration detection sensor 51 during the reverse rotation of the stirring-conveying screw 25. The polyethylene sheet 52*a* is more wear resistant than the nonwoven fabric 52*b*. Thus, it is possible, during the forward rotation of the stirring-conveying screw 25, to suppress wear of the scraper 52 caused by sliding on the detection surface 51*a* of the toner concentration detection sensor 51. Thereby, accumulation of the developer on the detection surface 51*a* of the toner concentration detection sensor 51 can be suppressed over a long period of time, and thus toner concentration can be accurately detected over a long period of time.

The coefficient of friction between the nonwoven fabric 52*b* and the detection surface 51*a* is higher than the coefficient of friction between the polyethylene sheet 52*a* and the detection surface 51*a*. That is, as compared with the polyethylene sheet 52*a*, the nonwoven fabric 52*b* has a greater cleaning power with respect to the detection surface 51*a* of the toner concentration detection sensor 51. Thus, by reversely rotating the stirring-conveying screw 25, it is possible to clean the detection surface 51*a* of the toner concentration detection sensor 51 more effectively with the nonwoven fabric 52*b*.

The stirring-conveying screw 25 forwardly rotates to stir and convey the developer in the development container 20 while image formation is being performed, and reversely rotates while image formation is not being performed. Thereby, while image formation is not being performed, the detection surface 51*a* can be cleaned with the nonwoven fabric 52*b* having the greater cleaning power.

The scraper 52 is formed by bonding the nonwoven fabric 52*b* and the polyethylene sheet 52*a* to each other. Thereby, the coefficient of friction between the member (the nonwoven fabric 52*b*) of the scraper 52 on the side opposite to the polyethylene sheet 52*a* and the detection surface 51*a* can be easily made higher than the coefficient of friction between the polyethylene sheet 52*a* and the detection surface 51*a*. Further, since the polyethylene sheet 52*a* is formed of an ultra-high molecular weight polyethylene, the wear resistance of the polyethylene sheet 52*a* can be easily improved.

Further, since the scraper 52 is held by being inserted in the first holding portion 61 and the second holding portion 62 of the scraper holder 60, mutual displacement of the polyethylene sheet 52*a* and the nonwoven fabric 52*b* constituting the scraper 52 is suppressed more effectively than in the conventional configuration where the scraper 52 is simply bonded to the stirring-conveying screw 25. Accordingly, it is possible to maintain the cleaning performance of the scraper over a long period of time.

Further, since the scraper 52 is attached so as to constitute part of the first helical blade 25*b*, influence of the scraper 52 on developer conveyance performance can be reduced as compared with in a case where the scraper 52 is attached so as to be parallel to the rotation shaft 25*a*.

Further, the surface of the scraper 52 on which the polyethylene sheet 52*a* is attached is on a downstream side in a rotation direction of the first helical blade 25*b* during forward rotation of the first helical blade 25*b*. Thereby, during the forward rotation of the stirring-conveying screw 25, it is possible to easily clean the detection surface 51*a* of the toner concentration detection sensor 51 with the polyethylene sheet 52*a* which has a high wear resistance and a low coefficient of friction. Further, by reversely rotating the stirring-conveying screw 25 periodically, it is possible to more securely clean the detection surface 51*a* of the toner concentration detection sensor 51 with the nonwoven fabric 52*b* which has a high coefficient of friction and a great cleaning power.

The embodiment described above is in no way meant to limit the present invention, which thus allows for many modifications and variations within the spirit of the present invention. For example, the embodiment described above has dealt with an example where the toner detection sensor 51 is provided in the stirring-conveying chamber 21, and the scraper 52 is attached to the stirring-conveying screw 25, but instead of this arrangement, the toner detection sensor 51 may be provided in the supplying-conveying chamber 22, and the scraper 52 may be attached to the supplying-conveying screw 26.

Further, the embodiment described above has dealt with an example where a two-component developer including carrier and toner is used as a developer, but this is not meant to limit the present invention, and one-component developer including only toner may be used as a developer instead. In that case, as a toner detection sensor, a toner remaining amount sensor may be used which detects a remaining amount of toner.

Further, the embodiment described above has dealt with a case where a magnetic permeability sensor is used as the toner detection sensor 51, but this is not meant to limit the present invention, and a sensor other than a magnetic permeability sensor, such as a piezoelectric sensor, may be used instead.

The embodiment described above has dealt with an example where the first member is formed using an ultra-high molecular weight polyethylene, but this is not meant to limit the present invention. The first member may be formed using a polyethylene other than an ultra-high molecular weight polyethylene, or the first member may be formed using a material (such as a resin) other than a polyethylene.

Further, the embodiment described above has dealt with an example where the second member of the scraper 52 is formed using a nonwoven fabric, but this is not meant to limit the present invention, and the second member may be formed using a material other than a nonwoven fabric.

Further, the present invention is applicable not only to tandem-type color printers as shown in FIG. 1, but also to various types of image forming apparatuses including both digital and analog types of monochrome copiers, color copiers, facsimile machines, etc. incorporating a developing device that includes a toner detection sensor and a scraper.

The invention claimed is:

1. A developing device, comprising:

a development container that stores a developer that includes a toner;

a stirring-conveying member that is forwardly and reversely rotatable and includes a rotation shaft and a conveying blade integrally formed with the rotation shaft, and that stirs and conveys the developer in the development container;

a toner detection sensor that detects a toner concentration or a toner remaining amount in the development container; and a scraper that is attached to the stirring-conveying member and that is caused to clean a detection surface of the toner detection sensor by rotation of the stirring-conveying member, the scraper including a first member that contacts the detection surface of the toner detection sensor during forward rotation of the stirring-conveying member, and a second member that contacts the detection surface of the toner detection sensor during reverse rotation of the stirring-conveying member, the first member being more wear resistant than the second member, with a coefficient of friction between the second member and the detection surface being higher than a coefficient of friction between the first member and the detection surface, wherein the stirring-conveying member includes a scraper holder that is formed so as to divide part of the conveying blade, and that holds the scraper along inclination of the conveying blade; and the scraper holder includes a first holding portion that is arranged on one side of the conveying blade divided and that includes a pair of first holding pieces that hold one side-end portion of the scraper therebetween, and a second holding portion that is arranged on another side of the conveying blade divided and that includes a pair of second holding pieces that hold another side-end portion of the scraper therebetween.

2. The developing device according to claim 1, wherein the scraper includes a positioning hole that penetrates through the first member and the second member; and the scraper holder includes a positioning protrusion that is inserted in the positioning hole.

3. The developing device according to claim 2, wherein the positioning hole has an oval shape of which an inner diameter in a circumferential direction of the stirring-conveying member is larger than an outer diameter of the positioning protrusion, and of which an inner diameter in a radial direction of the stirring-conveying member is equal to the outer diameter of the positioning protrusion.

4. The developing device according to claim 2, wherein of the pair of first holding pieces, the first holding piece that is arranged on an upstream side with respect to a phase advance direction of the conveying blade in the forward rotation of the stirring-conveying member is formed longer in a circumferential direction than the first holding piece that is arranged on a downstream side with respect to the phase advance direction of the conveying blade, and the first holding piece that is arranged on the upstream side has the positioning protrusion formed thereon.

5. The developing device according to claim 4, wherein the second member of the scraper contacts, of the pair of first holding pieces, the first holding piece that is arranged on the upstream side with respect to the phase advance direction of the conveying blade in the forward rotation of the stirring-conveying member.

6. The developing device according to claim 1, wherein while image formation is being performed, the stirring-conveying member forwardly rotates to thereby stir and convey the developer in the development container and clean the detection surface with the first member, and, while image formation is not being performed, the stirring-conveying member reversely rotates to thereby clean the detection surface with the second member.

7. The developing device according to claim 1, wherein an end portion of the scraper on a side at which the scraper contacts the detection surface is curved in an arc shape, and an end portion of the scraper on a side at which the scraper is fixed to the rotation shaft has a cut formed therein to avoid interference between the scraper and the rotation shaft when fitting the scraper to the scraper holder.

8. The developing device according to claim 1, wherein the first member is formed of an ultra-high molecular weight polyethylene sheet, and the second member is formed of a nonwoven fabric.

9. An image forming apparatus comprising the developing device according to claim 1.

* * * * *